United States Patent Office 3,094,422
Patented June 18, 1963

3,094,422
CORE ELEMENTS
Jean Reinhold, Paris, France, assignor to Fonderie de Precision, Nanterre, Seine, France
No Drawing. Filed Dec. 19, 1960, Ser. No. 76,448
Claims priority, application France Dec. 21, 1959
3 Claims. (Cl. 106—38.3)

The present invention is related to improvements in the casting of fusible materials such as metals or plastic, and relates more particularly to the use of novel cores in the production of hollow elements of these materials.

The use of cores in the casting and molding of hollow components is well known, particularly where removable cores such as sand or plaster are concerned. This common manner of providing hollow spaces in molded articles is widely used because the sand and plaster are capable of distintegration and are thus easily removed from the formed cavities. However, these materials have a low mechanical strength and it is therefore virtually impossible to inject the molding material under high pressure. In addition, many types of these materials produce inferior surface quality in the formed cavities.

The use of metallic cores permits the injection of the molding material under high pressure since the cores will have adequate strength. However, there are serious design limitations when using metallic cores. This results since the core design must be such that it is capable of being removed. Methods employing dissolving agents for removing metallic cores of more complex designs are not sufficiently effective since they are extremely time-consuming. The use of fusible materials as metallic cores presents the risks of melting of the cores during casting and incomplete removal of the core material once the casting is formed.

It is therefore an object of this invention to produce cores which have sufficient mechanical strength to permit casting even under high pressure and which, at the same time, will produce exceptionally smooth surface conditions.

It is a further object of this invention to produce cores which achieve the foregoing object while still being capable of removal in an extremely simple manner and which may also be employed in any desired configuration.

These and other objects will hereinafter appear and it will be understood that the specific embodiments hereinafter set forth are to be considered illustrative only and not limiting.

The present invention may be broadly described as a method including the steps of preparing a water-soluble molded core from a fused mixture, placing the core in a mold, introducing metallic or plastic molded material into the mold, removing the molded article from the mold, and finally placing it in an aqueous solution to dissolve the core.

It has been established that the melting and molding of cores from a mixture consisting substantially of from 20 to about 70 parts by weight of at least one alkaline metasilicate and 80 to 30 parts by weight of at least one alkaline disilicate will result in cores having the characteristics of this invention. Mixtures prepared, melted and molded from the above range of compositions will produce cores of high strength which are capable of being molded into any configuration, which produce castings having a smooth surface finish, and which have the singularly great advantage of being soluble in water.

Mixtures of potassium, lithium and sodium metasilicates and disilicates in any combination within the above ranges will provide cores having the above characteristics, including the property of being readily stripped from the molded article. It has been established, however, that mixtures containing the sodium compounds are more economical. The melting points of the various mixtures that can be obtained within the above range of compositions vary from eutectic points of about 850° C. to maximum melting temperatures of about 1100° C.

The use of the various materials in the above range of compositions surprisingly overcomes the disadvantages which are exhibited when any one of the metasilicates or disilicates is used alone. For example, the tendency of the sodium metasilicate to crystallize or devitrify upon cooling after solidification is eliminated by the addition of sodium disilicate. On the other hand sodium disilicate cores, which are extremely difficult to dissolve in water, are found to be readily soluble when the cores are prepared from sodium disilicate having additions of sodium metasilicate.

As suggested by the relatively wide variations in melting point which are possible in the mixtures of this invention, a particular mixture having a specifically desired melting point may be obtained by merely referring to the equilibrium diagrams for the various combinations of materials.

A special embodiment of this invention includes the addition of the borates, tungstates, plumbates, and silicates of the alkaline earth metals, or such materials as crushed glass, graphite, iron oxide and aluminum oxide, alone or in combination, in amounts up to about 10% by weight of the total mixture. These additions are found to reduce the sensitivity of cores manufactured from the basic compositions of this invention to thermal shock. The addition of these materials also enables adjustments in the dilation coefficient of the cores to be made.

A specific example of a core mixture found particularly suitable for the pressure casting of aluminum, zinc, and/or magnesium alloys is as follows:

| | Parts by weight |
|---|---|
| Anhydrous sodium metasilicate | 60 |
| Anhydrous sodium disilicate | 40 |
| Borax | 5 |
| Crushed glass | 2 |

In the production of hollow molded articles with cores of this composition, the above combination of elements is first reduced to the molten state. The core is then molded and placed in a casting mold into which the metal or plastic material is introduced. Finally, the cast body is placed in an aqueous solution, preferably hot, and the core material is quickly dissolved. Boiling water has been found to provide a quick and satisfactory medium for the removal of the core materials of this invention.

Mixtures of approximately the above ratio, without the additive elements included therein, have been found particularly suitable where thermal shock is not a quality control problem in the production of hollow molded articles, and where there is no need for the adjustment of the dilation coefficient.

It will be understood that various modifications in the above-disclosed process and core compositions may be made without departing from the spirit of this invention, particularly as defined in the following claims.

I claim:
1. A core element for the casting of hollow parts consisting of at least one alkaline metasilicate and at least one alkaline disilicate and consisting substantially of 20–70% by weight of anhydrous alkaline metasilicate and 80–30% by weight of anhydrous alkaline disilicate.
2. A core element for the casting of hollow parts consisting of a fused and molded mixture of from 20–70% by weight of anhydrous alkaline metasilicate and 80–30% by weight of anhydrous alkaline disilicate.
3. The core element according to claim 2 wherein said mixture contains up to about 10% of at least one element selected from the group consisting of the borates, tungstates, plumbates and silicates of the alkaline earth metals, crushed glass, graphite, iron oxide and aluminum oxide.

References Cited in the file of this patent

UNITED STATES PATENTS

| | | |
|---|---|---|
| 1,603,262 | Alden | Oct. 19, 1926 |
| 2,217,734 | Dreyfus | Oct. 15, 1940 |
| 2,949,375 | Reuter | Oct. 16, 1960 |
| 2,950,205 | Cardaras | Oct. 23, 1960 |

OTHER REFERENCES

Jeglum: "The Properties of Soluble Silicates," reprinted from Chemical-Industries, October and November 1941, 13 pages.

Vail: "Soluble Silicates in Industry," publ. 1928 by the Chemical Catalog Co., N.Y.C. (pages 112–113, 166, 121).